(12) United States Patent
Derr et al.

(10) Patent No.: US 9,641,216 B2
(45) Date of Patent: May 2, 2017

(54) MONITORING DEVICES AND SYSTEMS FOR MONITORING FREQUENCY HOPPING WIRELESS COMMUNICATIONS, AND RELATED METHODS

(75) Inventors: Kurt W. Derr, Idaho Falls, ID (US); John G. Richardson, Idaho Falls, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 1123 days.

(21) Appl. No.: 12/419,901

(22) Filed: Apr. 7, 2009

(65) Prior Publication Data

US 2010/0254431 A1    Oct. 7, 2010

(51) Int. Cl.
*H04K 1/10* (2006.01)
*H04L 27/28* (2006.01)
*H04B 1/713* (2011.01)

(52) U.S. Cl.
CPC .................. *H04B 1/713* (2013.01)

(58) Field of Classification Search
CPC .. H04W 88/06; H04W 8/005; H04L 27/2613; A01B 12/006; H04B 1/713
USPC ......... 375/132, 133, 260; 370/264, E01.033; 455/67.11
See application file for complete search history.

(56) References Cited

U.S. PATENT DOCUMENTS

| | | | |
|---|---|---|---|
| 6,718,395 B1 * | 4/2004 | Ziegler | 709/248 |
| 7,046,964 B1 * | 5/2006 | Sullivan et al. | 455/67.11 |
| 7,116,699 B2 * | 10/2006 | Batra et al. | 375/132 |
| 7,216,365 B2 | 5/2007 | Bhagwat et al. | |
| 7,236,511 B2 * | 6/2007 | Batra et al. | 375/132 |
| 8,149,893 B2 * | 4/2012 | So et al. | 375/132 |
| 8,485,125 B2 * | 7/2013 | Baumann et al. | 118/629 |
| 2003/0035388 A1 | 2/2003 | Schmidt | |
| 2004/0268351 A1 * | 12/2004 | Mogensen et al. | 718/100 |
| 2005/0207350 A1 * | 9/2005 | Bloebaum | 370/252 |
| 2006/0128308 A1 * | 6/2006 | Michael et al. | 455/41.2 |
| 2006/0176850 A1 * | 8/2006 | Gan et al. | 370/329 |
| 2007/0161349 A1 * | 7/2007 | Grushkevich | 455/41.2 |
| 2008/0126101 A1 * | 5/2008 | Tamura | 704/500 |
| 2008/0273549 A1 * | 11/2008 | Orfanos et al. | 370/462 |
| 2009/0046763 A1 * | 2/2009 | Kerai | 375/136 |
| 2009/0257396 A1 * | 10/2009 | Eliezer et al. | 370/330 |
| 2012/0243576 A1 * | 9/2012 | Hancock | 375/136 |

OTHER PUBLICATIONS

Frontline, "FTS4BT Wireless Bluetooth Protocol Analyzer & Packet Sniffer," (Sep. 22, 2008), 2 pages.
Frontline, "FTS4BT Air Sniffer Basic Tutorial," (Feb. 28, 2006), 8 pages.
Frontline Test Equipment, Inc., "White Paper: FTS for Bluetooth Virtual Sniffing," May 26, 2003, pp. 1-6.

* cited by examiner

*Primary Examiner* — Shuwang Liu
*Assistant Examiner* — Sung Ahn
(74) *Attorney, Agent, or Firm* — TraskBritt

(57) ABSTRACT

Monitoring devices and systems comprise a plurality of data channel modules coupled to processing circuitry. Each data channel module of the plurality of data channel modules is configured to capture wireless communications for a selected frequency channel. The processing circuitry is configured to receive captured wireless communications from the plurality of data channel modules and to organize received wireless communications according to at least one parameter. Related methods of monitoring wireless communications are also disclosed.

26 Claims, 3 Drawing Sheets

MONITORING DEVICES AND SYSTEMS FOR MONITORING FREQUENCY HOPPING WIRELESS COMMUNICATIONS, AND RELATED METHODS

GOVERNMENT RIGHTS STATEMENT

This invention was made with government support under Contract Number DE-AC07-05ID14517awarded by the United States Department of Energy. The government has certain rights in the invention.

TECHNICAL FIELD

Embodiments of the present invention relate generally to monitoring devices and methods. More particularly, embodiments of the present invention relate to monitoring devices and systems for detecting and monitoring wireless communications employing multiple frequency channels and hopping between frequency channels, as well as to associated methods.

BACKGROUND

Wireless technologies employing frequency hopping are becoming more pervasive in industry and government environments. One popular technology employing frequency hopping is BLUETOOTH®, which may be found on a wide variety of mobile devices or other wireless devices, such as personal digital assistants, smart phones, cell phones, micro PCs, laptops, printers, personal music players, digital cameras, video recorders, etc. Such BLUETOOTH® devices may be configured to operate as either discoverable or undiscoverable. When a device is configured to work in discoverable mode, the device is detectable by other BLUETOOTH® devices within communications range. When a device is configured in undiscoverable mode, the device may communicate with other BLUETOOTH® devices but will not be detectable by standard BLUETOOTH® communications adapters. Such a configuration may allow BLUETOOTH® communications to occur in areas not necessarily desired by an organization.

Conventional monitoring devices may be employed to monitor these wireless communications in order to discover security breaches or malicious communications. Conventional monitoring systems are configured to capture the wireless communications from and between wireless devices by communicating with the master device or the slave device to obtain clock synchronization as well as the frequency hopping sequence. Such communication between the monitoring device and the master or slave device is conventionally referred to as "handshaking." In order to carry out such handshaking communications with a master or slave device, it is typically required that the devices be discoverable. Therefore, conventional monitoring devices are unable to monitor wireless communications including one or more devices configured in undiscoverable mode, since the conventional monitoring device is unable to monitor without syncing to the clock and the frequency hopping sequence.

BRIEF SUMMARY

Various embodiments of the present invention comprise monitoring devices and systems configured to monitor frequency hopping wireless communications without handshaking or other transmission by the device or system. In one or more embodiments, the wireless communication monitoring device may comprise one or more data channel modules coupled to processing circuitry. The one or more data channel modules may be configured to capture wireless communications for at least one selected frequency channel of a plurality of frequency channels. The processing circuitry may be configured to receive captured wireless communications from the one or more data channel modules and to organize the captured wireless communications according to at least one parameter.

In one or more embodiments, the wireless communication monitoring system may comprise a receiver module configured to capture wireless communications transmitted over a plurality of frequency channels. The receiver module may comprise one or more data channel modules, and the one or more data channel modules may be configured to capture wireless communications for at least one selected frequency channel of the plurality of frequency channels. Processing circuitry may be coupled with the receiver module and configured to organize the captured wireless communications according to at least one parameter. Furthermore, an external device may be in communication with the processing circuitry and configured to receive and to process wireless communications that have been organized.

Other embodiments comprise methods of monitoring wireless communications, including frequency-hopping wireless communications. One or more embodiments of such methods may comprise monitoring a plurality of frequency channels at least substantially concurrently. At least one packet transmission may be captured on at least some of the frequency channels of the plurality of frequency channels. The plurality of packet transmissions may be organized according to at least one parameter.

DETAILED DESCRIPTION

In the following detailed description, circuits and functions may be shown in block diagram form in order not to obscure the present invention in unnecessary detail. Additionally, block definitions and partitioning of logic between various blocks as depicted is non-limiting, and comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, firmware, software, or combinations thereof.

Figure 1:
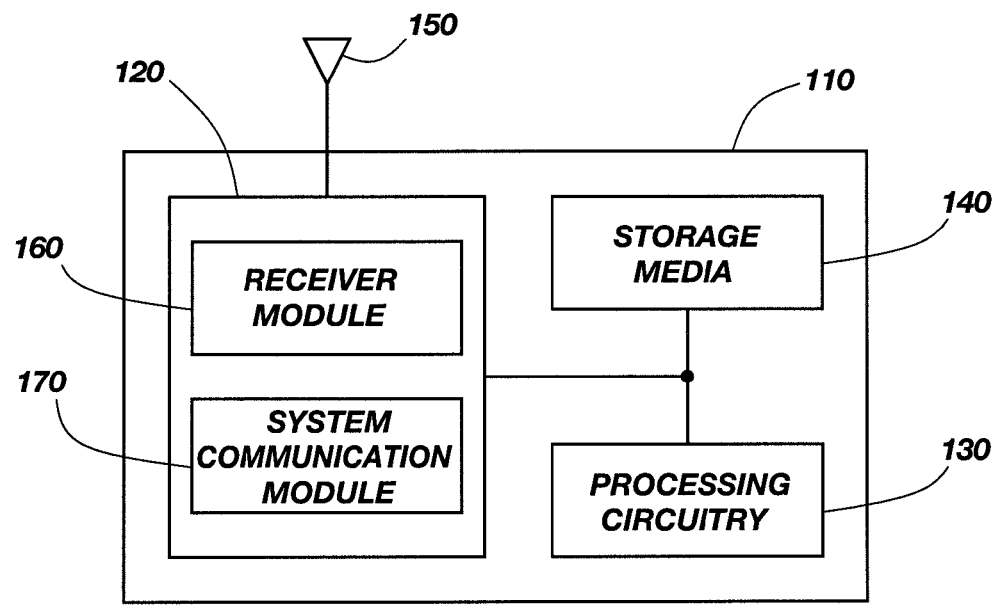
FIG. 1 is a block diagram depicting a configuration of a monitoring device according to at least some embodiments of the invention.

Various embodiments of the present invention comprise monitoring devices for detecting and monitoring multi-channel wireless communications. FIG. 1 illustrates a configuration of a monitoring device 110 according to at least some embodiments. A monitoring device 110 may comprise a communications module 120, processing circuitry 130 and storage media 140. Other arrangements within the scope of the invention are contemplated, including more, fewer and/or alternative components.

The communications module 120 is configured to implement wireless and/or wired communications of the monitoring device 110. For example, in some embodiments, the communications module 120 may be configured to capture wireless communications between wireless devices over a plurality of data channels and to communicate information bi-directionally with respect to other devices of a monitoring system. The communications module 120 may be coupled with an antenna 150. By way of example and not limitation, in some embodiments, the antenna 150 may comprise a high-gain directional antenna configured to allow a user to direct the range of coverage to a specific area or areas. The communications module 120 may comprise software, firmware, hardware, and combinations thereof for capturing wireless communications from wireless devices, as well as for wireless communicating with other devices of the monitoring system. The communications module 120 may also include a network interface card (NIC), serial or parallel connection, USB port, FIREWIRE® interface, Flash memory interface, or any other suitable arrangement for communicating with respect to public (e.g., Internet) and/or private networks or other wired arrangements.

In at least some embodiments, the communications module 120 may be configured to detect and capture wireless communications of one or more wireless devices within a monitored area, and send and/or receive communications to/from one or more other devices of the monitoring system. By way of example and not limitation, the communications module 120 may include a receiver module 160 configured for capturing wireless communications between wireless devices that are transmitted over a plurality of data channels, and a system communication module 170 configured to communicate with other devices of the monitoring system.

In some embodiments, processing circuitry 130 is arranged to obtain data, process data, send data, and combinations thereof. The processing circuitry 130 may also control data access and storage, issue commands, and control other desired operations. Processing circuitry 130 may comprise circuitry configured to implement desired programming provided by appropriate media in at least one embodiment. For example, the processing circuitry 130 may be implemented as one or more of a processor, a controller, a plurality of processors and/or other structure configured to execute executable instructions including, for example, software and/or firmware instructions, and/or hardware circuitry. Embodiments of processing circuitry 130 may include a general purpose processor(s), a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. These examples of processing circuitry 130 are for illustration and other suitable configurations within the scope of the invention are also contemplated for use within the scope of the invention.

The storage media 140 is configured to store programming such as executable code or instructions (e.g., software, firmware, or a combination thereof), electronic data, databases, or other digital information and may include processor-usable media. A non-limiting example of a database may include information regarding a plurality of network traffic profiles relating to network communications in one or more monitored areas. A storage medium may be any available media that can be accessed by a general purpose or special purpose computer. By way of example and not limitation, a storage medium may comprise one or more devices for storing data, including read-only memory (ROM), random access memory (RAM), magnetic disk storage mediums, optical storage mediums, Flash memory devices, solid-state hard disk, other computer-readable mediums for storing information, and combinations thereof.

Processor-usable media may be embodied in any computer program product(s) or article(s) of manufacture that can contain, store, or maintain programming, data and/or digital information for use by or in connection with an instruction execution system including processing circuitry in the exemplary embodiment. For example, suitable processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, Flash memory, cache memory, and/or other configurations capable of storing programming, data, or other digital information.

At least some embodiments described herein may be implemented using programming stored within appropriate storage media described above and/or communicated via a network or other transmission media and configured to control appropriate processing circuitry. For example, programming may be provided via appropriate media including, for example, programming embodied within articles of manufacture, embodied within a data signal (e.g., modulated carrier wave, data packets, digital representations, etc.) communicated via an appropriate transmission medium, such as a communication network (e.g., the Internet, a private network, and combinations thereof), wired electrical connection, optical connection and/or electromagnetic energy, for example, via a communications interface, or provided using other appropriate communication structure or medium. Programming including processor-usable code may be communicated as a data signal embodied in a carrier wave, in but one example.

Figure 2:
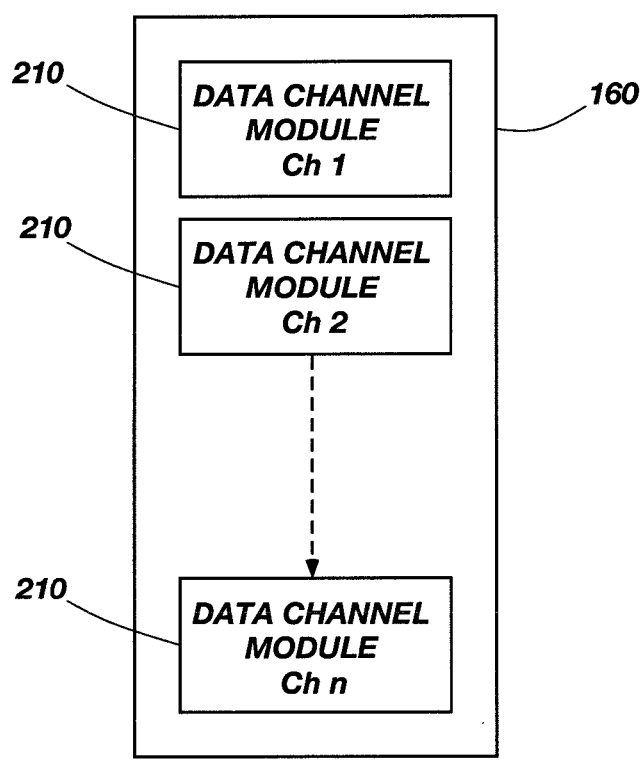
FIG. 2 is a block diagram illustrating a configuration of a receiver module according to at least some embodiments of the invention.

Various wireless communication technologies implement wireless communications over a plurality of frequency channels (also referred to herein as "data channels") by employing a form of frequency hopping, wherein the wireless communications are transmitted by rapidly switching among the many frequency channels, using a pseudorandom sequence known to both the transmitting and receiving wireless devices. One example of such communication methods is found in conventional BLUETOOTH® wireless technology, which employs a method known as frequency-hopping spread spectrum (FHSS). In at least some embodiments, the receiver module 160 may be configured to monitor a plurality of frequency channels concurrently. FIG. 2 illustrates at least one embodiment of a receiver module 160 configured to capture wireless communications for devices configured to communicate over a plurality of frequency channels without handshaking with the communicating wireless devices. The receiver module 160 may comprise one or more data channel modules 210. The number of data channel modules 210 in the receiver module 160 may depend on the specific embodiment of the receiver module 160.

In some embodiments, the receiver module 160 may comprise one data channel module 210 configured to scan each frequency channel of the plurality of frequency channels at a rate substantially greater than the rate at which the wireless communications hop between the plurality of frequency channels. For example, such a receiver module 160 may scan the plurality of frequency channels at a rate sufficient to scan each data channel equal to the Nyquist rate, or two times the hopping frequency. For example, for BLUETOOTH® wireless technology, the wireless communications change data channels up to 1600 times per second. Thus, each data channel would be scanned at least 3200 times per second.

In other embodiments, the receiver module 160 may comprise a plurality of data channel modules 210. The plurality of data channel modules 210 may be configured so that each data channel module 210 may scan two or more frequency channels of the plurality of frequency channels. In such embodiments, when one data channel module 210 detects wireless communications on one of the frequency channels it is assigned to monitor, the one data channel module 210 may stop monitoring the assigned frequency channels to capture the detected wireless communication on the one frequency channel. While the one data channel module 210 is capturing the detected wireless communications on the one frequency channel, at least one other data channel module 210 may be assigned to monitor the other frequency channels assigned to the one data channel module 210 that the one data channel module 210 is unable to monitor. In still other embodiments, one receiver module 160 may be configured to scan each of the data channels, and to assign another data channel module 160 to capture wireless communications on a data channel when communications are detected.

In other embodiments, a data channel module 210 may be provided for each frequency channel used for a given communication technology. For example, current BLUETOOTH® wireless technology employs seventy-nine (79) frequency channels for wireless communications. Therefore, by way of example and not limitation, in some embodiments of a receiver module 160 configured to monitor BLUETOOTH® communications, the receiver module 160 may comprise seventy-nine individual data channel modules 210, each data channel module 210 being configured to detect and capture wireless communications for one frequency channel of the seventy-nine frequency channels.

Figure 3:
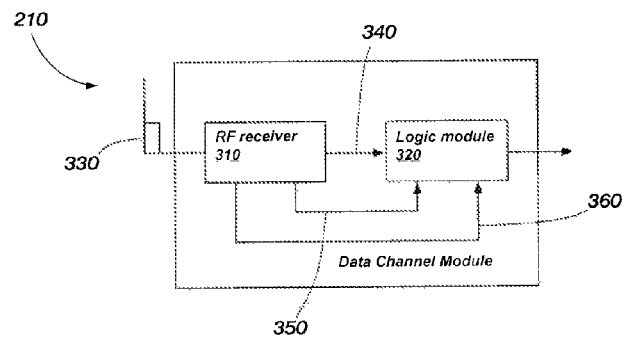
FIG. 3 is a block diagram depicting a configuration of a data channel module according to at least some embodiments of the invention.

FIG. 3 illustrates a configuration of a data channel module 210 according to some embodiments. The data channel module 210 may comprise an RF receiver 310 coupled with a logic module 320 and an antenna 330. The RF receiver 310 may comprise a radio frequency transceiver or receiver configured to receive wireless communications for at least one wireless technology. By way of example and not limitation, a suitable RF receiver 310 for monitoring BLUETOOTH® wireless communications may include the SGN6010Bluetooth Transceiver IC by Signia Technologies of Taipei City, Taiwan. The RF receiver 310 is configured to monitor at least one frequency channel of the plurality of frequency channels employed by a frequency hopping wireless technology and detect communications on the one or more frequency channels. The RF receiver 310 may also be configured to generate a synchronized clock output and to decode the detected wireless communications. The RF receiver 310 is coupled to the logic module 320 to provide electrical signals thereto representing, for example, a bit stream (indicated by arrow 340), a received signal strength indicator (RSSI) (indicated by arrow 350), a clock output (indicated by arrow 360), as well as combinations thereof.

The logic module 320 may be implemented as software, firmware, hardware, and combinations thereof to perform at least a data formatting function in the data channel module 210. In some embodiments, the logic module 320 may comprise a buffer configured to at least temporarily store data received by the RF receiver 310. By way of example only, at least some embodiments of the logic module 320 may comprise a shift register configured to store bit data from the detected wireless communications and to output the stored bit data to some processing circuitry or storage media.

In other embodiments of a data channel module 210, one or more logic module 320 may be associated with a plurality of RF receivers 310 and may be assigned dynamically to a frequency channel as wireless communications are detected on one or more frequency channels. By way of example and not limitation, an RF receiver 310 of a data channel module 210 may scan one or more frequency channels and a logic module 320 may be assigned to a frequency channel when an RF receiver 310 detects a communication thereon.

Figure 4:
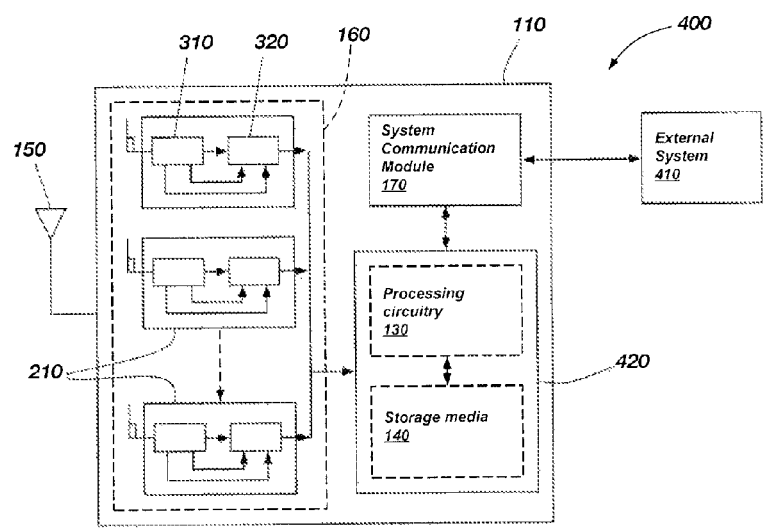
FIG. 4 illustrates a block diagram depicting a monitoring system according to at least some embodiments of the invention.

Additional embodiments of the present invention comprise a system for monitoring multi-channel wireless communications. FIG. 4 illustrates a block diagram of a monitoring system 400 according to some embodiments comprising a monitoring device 110 having a plurality of data channel modules 210 and an external system 410, which may also be referred to herein as an external device. The monitoring device 110 may comprise embodiments of the monitoring device 110 described above including a receiver module 160, a system communication module 170, storage media 140 and processing circuitry 130. In some embodiments, the processing circuitry 130 and storage media 140 may comprise a conventional CPU and memory, referred to herein as CPU 420. The external system 410 may comprise a computational system comprising an input device, an output device, a processor device and a memory device. By way of example and not limitation, the external system 410 may comprise a conventional desktop or laptop computer. The external system 410 may be configured to communicate with the monitoring device 110 through the system communication module 170.

The operation of a monitoring system according to some embodiments of the invention is set forth with reference to FIG. 4. One or more wireless devices (not shown) may transmit a wireless communication employing a wireless technology utilizing frequency hopping on multiple frequency channels. An antenna 150 coupled to the monitoring device 110 may receive the signals relating to those wireless communications and provide the wireless communication signals to a receiver module 160 comprising a plurality of data channel modules 210. As described above, each data channel module 210 of the plurality of data channel modules 210 may be configured to receive wireless communication signals for at least one predetermined frequency channel. As the wireless communications hop between different frequency channels, different data channel modules 210 may be tuned to one or more respective frequency channels for receiving packets of the wireless communications on each frequency channel to which the wireless communications may hop. When the wireless communications hop to a frequency channel to which a specific data channel module 210 is tuned, that specific data channel module 210 captures the packet data of the packet transmission for the wireless communications. The data channel modules 210 may then extract the bit data from the wireless communications and communicate the bit data to the processing circuitry 130.

In the embodiments illustrated in FIG. 4, the data channel modules 210 are configured similar to the data channel module 210 of FIG. 3 comprising an RF receiver 310 coupled with a logic module 320. When a packet transmission is present on a specific frequency channel, the RF receiver 310 tuned or configured to scan that frequency channel detects an RSSI level change and indicates to the logic module 320 that the packet transmission is present on that frequency channel. For varying signal levels, there is typically a varying delay between occurrence of the signal related to the packet transmission and the generation of the RSSI level change. Accordingly, the data channel modules 210 or the CPU 420 or both may be configured to store sampled bit data of the packet transmission from a point in time previous to detection of the RSSI level change. In order to store bit data received at a point in time prior to detecting the RSSI level change, the data channel modules 210 are configured to continuously stream data being received by each data channel module 210.

Upon detection of the RSSI level change, the RF receiver 310 may be configured to generate timing information to the logic module 320. The timing information may comprise a clock signal generated by the RF receiver 310 and synchronized to the bit data received by the RF receiver 310. This timing information enables the logic module 320 to sample the received bit data at the proper time by syncing the clock signal with bits of the bit data. As the bit data is streamed from the RF receiver 310 to the logic module 320, the bit data is sampled and stored by the logic module 320. In some embodiments, the logic module 320 comprises a shift register or similar circuitry for serially storing the bit data and for providing serial or parallel output to the CPU 420.

The CPU 420 may be configured to receive the bit data comprising the packet transmissions from the data channel modules 210 and to organize the bit data according to one or more specific parameters. Because the bit data may be received asynchronously from the data channel modules 210, the data may not be in proper time sequence. Furthermore, because the plurality of data channel modules 210 may simultaneously receive any wireless communications on the respective frequency channels, the bit data streamed to the CPU 420 may relate to several different wireless communications between multiple devices. Therefore, the CPU 420, according to some embodiments, may be configured to order the bit data according to the transmission sequence, the transmitting device, the receiving device, and combinations thereof. This may be accomplished in the CPU 420 by analyzing the packet transmission to identify the portions of the bit data comprising the packet header and the packet information. The header may be analyzed by the CPU 420 to identify one or more parameters for grouping, ordering, or both. By way of example and not limitation, the CPU 420 may identify parameters such as the identification of the transmitting and receiving devices for grouping the packets into groups of related wireless communications, as well as the sequence number of the packet for ordering the packets into their proper transmission sequence.

Figure 5:
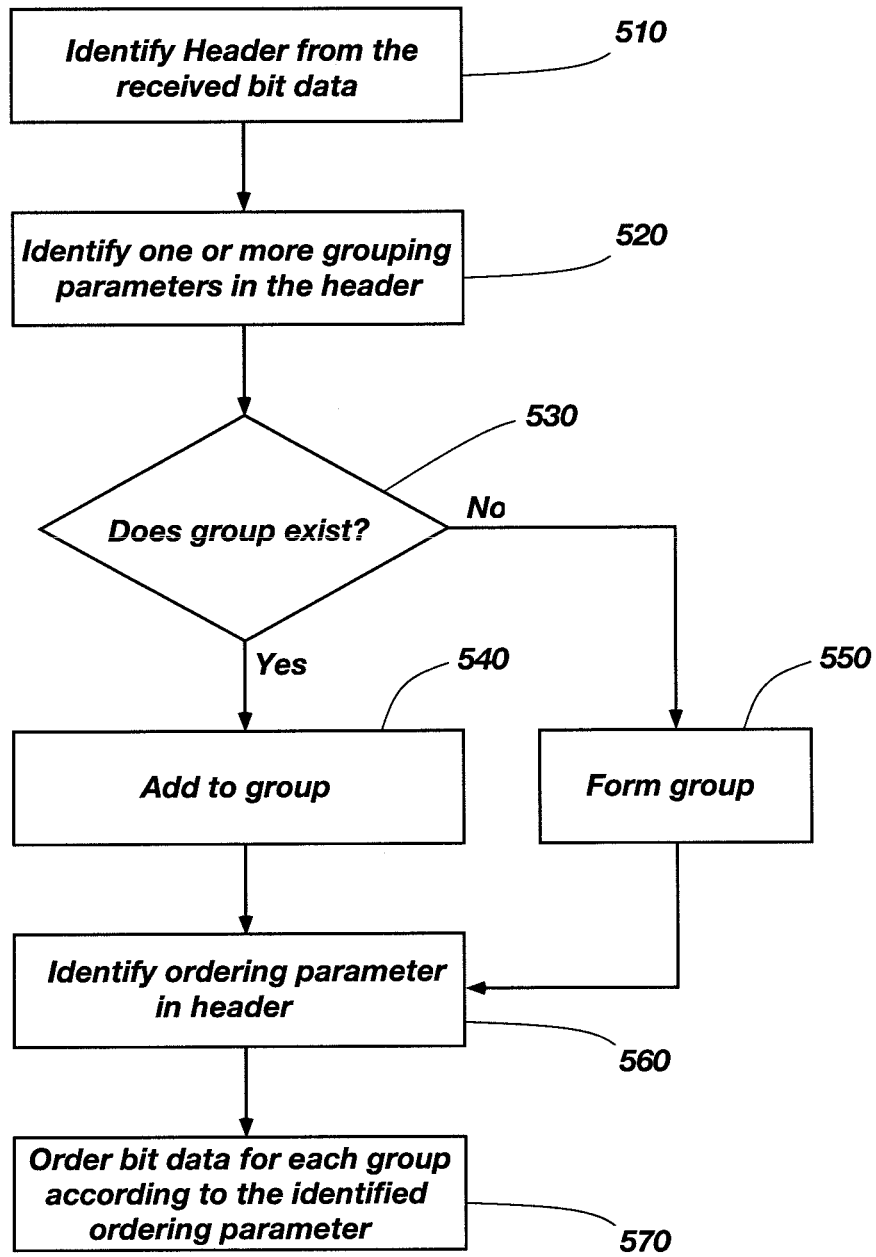
FIG. 5 is a flow diagram depicting the organization of received packets according to one or more parameters according to some embodiments of the invention.

FIG. 5 is a flow diagram depicting the organization of received packets according to one or more parameters according to some embodiments of the invention. The organization of the bit data comprising the packet transmissions may be carried out in the CPU 420. The CPU 420 may be configured to receive the bit data and identify a packet header in the received bit data 510. Upon identifying the header, one or more parameters may be identified therein to be used in organizing a plurality of packet transmissions 520. By way of example and not limitation, parameters may be identified in the header which relate to a transmission sequence, an identification of the transmitting device, an identification of the receiving device, a transmission time, a wireless technology profile, and a transmission type. It may be determined whether a group exists for the given parameter(s) 530. If a group has already been created of bit data comprising the given parameter(s), the bit data comprising the packet transmission may be added to the existing group 540. If a group has not already been created of bit data comprising the given parameter(s), a group may be formed to which the received bit data may be included 550.

After one or more groups are formed, the bit data of at least one group may be ordered according to at least one ordering parameter. The at least one ordering parameter may be identified in the packet header 560. By way of example and not limitation, a parameter used for ordering the bit data comprising the packet transmissions may include the transmission sequence number found in the header. Thus, the bit data received on a plurality of data channel modules 210 may be ordered according to the transmission sequence. Upon identifying the ordering parameter, the bit data received from each data channel module 210 may be ordered according to the identified ordering parameter 570. In embodiments in which the bit data is both grouped and ordered, the packet data for each group may be ordered according to the identified ordering parameter. In other embodiments, the packet transmissions may only be grouped or ordered as described herein.

Returning to FIG. 4, the organized bit data may be communicated from the monitoring device 110 to the external system 410 for further analysis or processing. In some embodiments, the external system 410 may further comprise an application programming interface (API) configured to control the detection and monitoring processes of the monitoring device 110. In some embodiments, the external system 410 may request one or more of a number of preprocessing functions and configuration functions from the monitoring device 110. In some embodiments, such preprocessing functions and configuration functions may comprise specifying parameters for grouping the packets of the wireless communications, as well as requesting the monitoring device 110 to communicate only those packets appertaining to the specified group. By way of example and not limitation, the monitoring device 110 may be requested to perform one or more of the following functions: provide all packets from time $t_i$ up to and including time $t_j$; provide all packets for a specific profile of the wireless technology (e.g., service discovery, cordless telephone, intercom, serial port, headset, fax, file transfer, and others); provide all packet communications between a specific master device and specific slave device(s); provide all inquiry message packets; provide all inquiry response packets; provide all page message packets; provide all page response packets; provide all Frequency Hop Synchronization packets; monitor specific wireless devices; monitor specific wireless profiles; as well as any permutation or combination of the above.

In a more specific example, and by way of example and not limitation, some embodiments of the monitoring system 400 may be configured to detect and capture BLUETOOTH® wireless communications. In some embodiments, such a monitoring device 110 may comprise a receiver module 160 having seventy-nine data channel modules 210. Each of the data channel modules 210 is configured to be tuned to one of the seventy-nine, 1 MHz-wide frequency channels in the 2.4 GHz band used by BLUETOOTH® wireless communications. In other embodiments, the receiver module 160 may comprise ten data channel modules 210, each data channel module 210 being configured to scan nine frequency channels, with one extra data channel module 210 to monitor a group of frequency channels when the respective data channel module 210 is unavailable. As set forth herein above, other configurations of data channel modules 210 may be employed.

As wireless communications between devices occurs, packets are transmitted on several of the frequency channels. For each data channel module 210 that is tuned to a frequency channel over which a packet transmission occurs, the bit data of the packet transmission is stored and communicated to the CPU 420. The CPU 420 may be configured to analyze the header information for each packet transmission received to group and/or order the bit data. For example, in some configurations, the CPU 420 may analyze the header and group the packets according to the master device and the slave device(s). The CPU 420 may then order the packets according to the sequence number of each packet. The grouped and ordered packets comprising the wireless communications between wireless devices may then be communicated to the external system 410 for further analysis or processing.

Additional embodiments of the present invention comprise methods of monitoring wireless communications, and, more particularly, monitoring frequency-hopping wireless communications. According to at least one embodiment, wireless communications comprising a plurality of packet transmissions hopping between a plurality of frequency channels may be captured. The plurality of packet transmissions may be captured with at least one data channel module, as described above. The one or more data channel modules may be configured to concurrently monitor multiple frequency channels of the plurality of frequency channels, including concurrently monitoring each frequency channel of the plurality of frequency channels. The plurality of packet transmissions may be captured by detecting the presence of the packet transmissions with a data channel module and storing the bit data of the packet transmission in the data channel module. As discussed above, the detection of the packet transmissions may include detecting an RSSI level change with an RF receiver of the data channel module.

Upon capturing the plurality of packet transmissions, the packet transmissions may be organized according to at least one parameter. The at least one parameter may be identified from a portion of each packet transmission as discussed above and then grouping and/or ordering the packet transmissions according to the identified parameter(s). As set forth herein above by way of example and not limitation, in some embodiments, the at least one parameter may comprise a transmission sequence, an identification of a transmitting device, an identification of a receiving device, a transmission time, a wireless technology profile, a device ID, and a transmission type.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims that follow.

What is claimed is:

1. A wireless communication monitoring device, comprising:
    a plurality of data channel modules, each data channel module of the plurality of data channel modules configured to capture wireless communications of data for at least one selected frequency channel of a plurality of frequency channels substantially unrelated to frequency hopping sequences of the captured wireless communications, wherein capturing the wireless communications is performed without prior knowledge of the frequency hopping sequences and without participating in handshake protocols; and
    processing circuitry coupled to the plurality of data channel modules and configured to:
        receive the captured wireless communications from the plurality of data channel modules;
        regardless of order received at the processing circuitry and regardless of the data channel module received from, identify that packets from at least two different data channel modules of the plurality belong to a group responsive to at least one parameter in the packets identifying at least one of a transmitting device, a receiving device, and a transmission sequence; and
        organize the data in the captured wireless communications from the at least two different data channel modules of the plurality of data channel modules into the group according to the at least one parameter.

2. The monitoring device of claim 1, wherein each data channel module of the plurality of data channel modules is configured to receive wireless communications for a single frequency channel.

3. The monitoring device of claim 2, wherein the plurality of data channel modules comprises seventy-nine data channel modules.

4. The monitoring device of claim 1, wherein the plurality of data channel modules each comprises:
    a Radio Frequency (RF) receiver configured to receive wireless communications for the at least one selected frequency channel; and
    a logic module coupled to the RF receiver.

5. The monitoring device of claim 1, wherein the plurality of data channel modules each comprises:
    a plurality of RF receivers configured to receive wireless communications for the at least one selected frequency channel; and
    at least one logic module coupled to the plurality of RF receivers.

6. The monitoring device of claim 1, wherein the processing circuitry is configured to organize the captured wireless communications according to the at least one parameter selected from the group of parameters consisting of a transmission sequence, an identification of a transmitting device, an identification of a receiving device, a transmission time, a wireless technology profile, a device ID, and a transmission type.

7. A system for monitoring wireless communications, comprising:
    a receiver module configured to capture wireless communications transmitted over a plurality of frequency channels, the receiver module comprising a plurality of data channel modules, each data channel module of the plurality of data channel modules configured to capture wireless communications of data for at least one selected frequency channel of the plurality of frequency channels substantially unrelated to frequency hopping sequences of the captured wireless communications, wherein capturing the wireless communications is performed without prior knowledge of the frequency hopping sequences and without participating in handshake protocols;
    processing circuitry coupled with the receiver module and configured to organize the captured wireless communications from at least two different data channel modules of the plurality of data channel modules regardless of which data channel module of the plurality the captured wireless communications are from and according to at least one parameter identifying at least one of a transmitting device, a receiving device, and a transmission sequence; and
    at least one external device in communication with the processing circuitry and configured to receive and to process wireless communications that have been organized.

8. The system of claim 7, wherein each data channel module of the plurality of data channel modules is configured to receive wireless communications for more than one frequency channel of the plurality of frequency channels.

9. The system of claim 7, wherein each data channel module of the plurality of data channel modules is configured to receive wireless communications for a single frequency channel.

10. The system of claim 9, wherein the plurality of data channel modules comprises seventy-nine data channel modules.

11. The system of claim 7, wherein the plurality of channel modules comprises:
   a Radio Frequency (RF) receiver tuned to receive wireless communications for the at least one selected frequency channel; and
   a logic module coupled to the RF receiver.

12. The system of claim 7, wherein the plurality of channel modules comprises:
   a plurality of RF receivers configured to receive wireless communications for two or more frequency channels of the plurality of frequency channels; and
   at least one logic module coupled to the plurality of RF receivers.

13. The system of claim 7, wherein the processing circuitry is configured to organize the captured wireless communications according to the at least one parameter selected from the group of parameters consisting of a transmission sequence, an identification of a transmitting device, an identification of a receiving device, a transmission time, a wireless technology profile, a device ID, and a transmission type.

14. The system of claim 7, wherein the at least one external device comprises an input device, an output device, a processor device, and a memory device.

15. The system of claim 7, wherein the at least one external device is configured to operably control the processing circuitry.

16. A method of monitoring wireless communications, comprising:
   capturing data in wireless communications hopping between a plurality of frequency channels with a plurality of data channel modules, each data channel module associated with at least one frequency channel of the plurality of frequency channels in an association substantially unrelated to frequency hopping sequences of the captured wireless communications, wherein passively capturing the data in the wireless communications is performed without prior knowledge of the frequency hopping sequences and without participating in handshake protocols; and
   organizing the data in the wireless communications captured by at least two different data channel modules of the plurality of data channel modules regardless of order presented from the plurality of data channel modules according to at least one parameter identifying at least one of a transmitting device, a receiving device, and a transmission sequence.

17. The method of claim 16, wherein capturing the wireless communications comprises:
   detecting the presence of a wireless communication on a frequency channel with a data channel module of the plurality of data channel modules; and
   storing bit data of a packet transmission in the data channel module.

18. The method of claim 17, wherein detecting the presence of the wireless communication on the frequency channel with the data channel module of the plurality of data channel modules comprises detecting a Received Signal Strength Indicator (RSSI) level change with a Radio Frequency (RF) receiver of the data channel module.

19. The method of claim 16, wherein organizing the captured wireless communications according to the transmission sequence comprises:
   identifying a sequence number in the captured wireless communications; and
   ordering the captured wireless communications numerically according to the sequence number.

20. The method of claim 16, wherein organizing the captured wireless communications according to the at least one parameter comprises grouping the captured wireless communications according to at least one of an identification of a transmitting device, an identification of a receiving device, a transmission time, a wireless technology profile, a device ID, and a transmission type.

21. A method of monitoring frequency-hopping wireless communications, comprising:
   monitoring more than one frequency channel of a plurality of frequency channels concurrently, wherein the monitoring is substantially unrelated to frequency hopping sequences of captured wireless communications;
   capturing a plurality of packet transmissions on each of at least two of the frequency channels of the plurality of frequency channels, wherein capturing the wireless communications is performed without prior knowledge of the frequency hopping sequences and without participating in handshake protocols;
   regardless of order that the plurality of packet transmissions are presented after capturing, identifying that packets from at least two different frequency channels of the plurality belong to a group responsive to at least one parameter in the packet transmissions identifying at least one of a transmitting device, a receiving device, and a transmission sequence; and
   organizing the plurality of packet transmissions on each of at least two of the frequency channels into one or more groups according to the at least one parameter selected from the group consisting of a transmitting device, a receiving device, and a transmission sequence.

22. The method of claim 21, wherein monitoring more than one frequency channel of the plurality of frequency channels concurrently comprises scanning frequency channels among the plurality of frequency channels with a plurality of data channel modules.

23. The method of claim 21, wherein monitoring more than one frequency channel of the plurality of frequency channels concurrently comprises providing a plurality of data channel modules, each data channel module of the plurality of data channel modules configured to monitor a respective frequency channel of the plurality of frequency channels.

24. The method of claim 21, wherein capturing the plurality of packet transmissions comprises:
   detecting a presence of a wireless communication on a respective frequency channel with a data channel module configured to monitor the respective frequency channel; and
   storing bit data of the packet transmission in the data channel module.

25. The method of claim 21, wherein organizing the plurality of packet transmissions according to the at least one parameter comprises organizing the plurality of packet transmissions according to the at least one parameter selected from the group of parameters consisting of a sequence number, an identification of a transmitting device, an identification of a receiving device, a transmission time, a wireless technology profile, a device ID, and a transmission type.

26. The method of claim 21, wherein organizing the plurality of packet transmissions according to the at least one parameter comprises:
   grouping at least some of the plurality of packet transmissions according to the at least one parameter comprising at least one of an identification of a transmitting device and an identification of a receiving device; and
   ordering the at least some of the plurality of packet transmissions for a group according to a transmission sequence.

* * * * *